United States Patent
Suzuki et al.

[11] Patent Number: 5,940,214
[45] Date of Patent: Aug. 17, 1999

[54] OPTICAL ARRANGEMENT WITH DIFFRACTIVE OPTICAL ELEMENT

[75] Inventors: Masayuki Suzuki; Satoru Mizouchi, both of Utsunomiya, Japan

[73] Assignee: Canon Kabushiki Kaisha, Tokyo, Japan

[21] Appl. No.: 08/990,747

[22] Filed: Dec. 15, 1997

[30] Foreign Application Priority Data

Dec. 13, 1996 [JP] Japan .................................. 333640

[51] Int. Cl.⁶ ............................ G02B 27/44; G02B 9/00
[52] U.S. Cl. .................... 359/565; 359/570; 359/739
[58] Field of Search ................................. 359/565, 569, 359/570, 739, 740

[56] References Cited

U.S. PATENT DOCUMENTS

| | | | |
|---|---|---|---|
| 5,004,328 | 4/1991 | Suzuki et al. ........................ | 359/664 |
| 5,013,133 | 5/1991 | Buralli et al. ........................ | 359/558 |
| 5,268,790 | 12/1993 | Chen ................................... | 359/558 |
| 5,418,649 | 5/1995 | Igarashi ............................... | 359/740 |
| 5,493,441 | 2/1996 | Chipper ............................... | 359/354 |
| 5,638,212 | 6/1997 | Meyers et al. ........................ | 359/569 |
| 5,706,141 | 1/1998 | Abe ..................................... | 359/740 |
| 5,717,525 | 2/1998 | Estelle et al. ........................ | 359/677 |
| 5,731,917 | 3/1998 | Meyers ................................ | 359/742 |
| 5,793,539 | 8/1998 | Konno et al. ........................ | 359/739 |
| 5,841,586 | 11/1998 | Nagaoka .............................. | 359/654 |

FOREIGN PATENT DOCUMENTS 6-331887  12/1994  Japan .......................... G02B 13/18

*Primary Examiner*—Cassandra Spyrou
*Assistant Examiner*—John Juba, Jr.
*Attorney, Agent, or Firm*—Fitzpatrick, Cella, Harper & Scinto

[57] ABSTRACT

An optical arrangement including a stop, and an optical element with a diffractive optical surface, wherein the diffractive optical surface is defined on a spherical surface of a curvature radius r, and wherein, where the distance from a point on the diffractive optical surface, which is on an optical axis, to a center of the stop as viewed from the diffractive optical surface is t, a relation $0.8 \leq r/t \leq 1.2$ is satisfied.

7 Claims, 13 Drawing Sheets

5,940,214

OPTICAL ARRANGEMENT WITH DIFFRACTIVE OPTICAL ELEMENT

FIELD OF THE INVENTION AND RELATED ART

This invention relates to an optical arrangement with a diffractive optical element, widely usable in an optical system such as a photographic lens or a lithographic lens, for example.

An optical arrangement with a diffractive optical element has recently been proposed. An example is a lens system with a diffractive optical element for use in an optical disc or a photographic lens, as disclosed in Japanese Laid-Open Patent Application, Laid-Open No. 331887/1994. In this example, a diffractive optical element is disposed on a curved surface, by which aberrations such as chromatic aberration and monochromatic aberration are corrected.

In the example described above, however, the range of incidence angle of light impinging on the diffractive optical element becomes wider with the increase of view angle. This causes decrease of diffraction efficiency in the off-axis region and, thus, decrease of light intensity. Also, there occurs flare which deteriorates the image quality.

SUMMARY OF THE INVENTION

It is an object of the present invention to provide an optical arrangement with diffractive optical element, by which a good quality image can be provided with less decrease of diffraction efficiency in the off-axis region.

In accordance with an aspect of the present invention, there is provided an optical arrangement with diffractive optical element, which comprises a stop and an optical element, wherein a diffractive optical surface is defined on a spherical surface of the optical element having a curvature radius r, and wherein, where the distance from a point on the diffractive optical surface, which is on the optical axis, to the center of the stop as viewed from the diffractive optical surface is t, the following relation is satisfied:

$$0.8 \leq r/t \leq 1.2$$

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

The present invention will now be described specifically with reference to examples of optical arrangement applied to a photographic lens.

Embodiment 1

Figure 1:
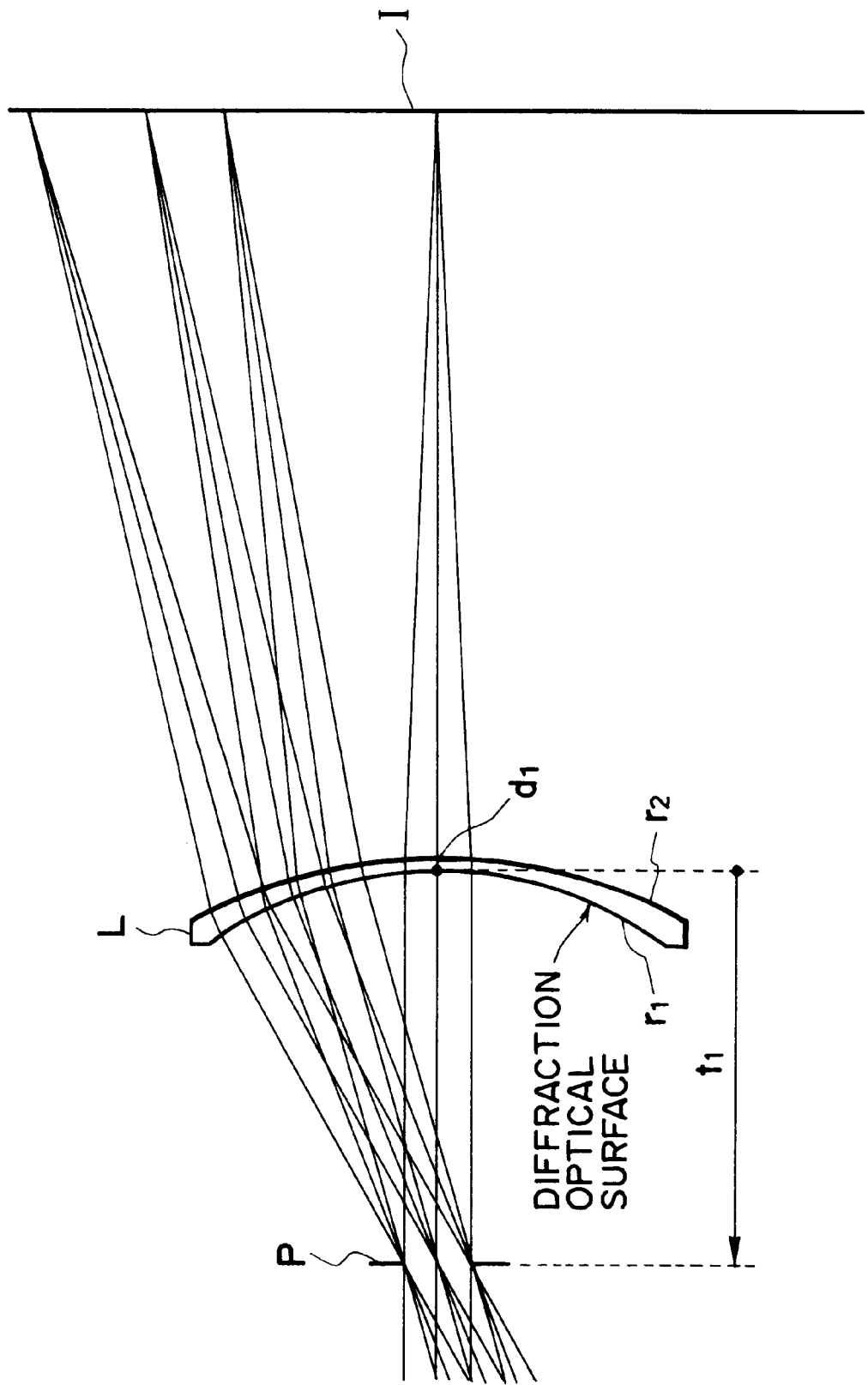
FIG. 1 is a schematic view of an optical arrangement according to a first embodiment of the present invention.

FIG. 1 shows an optical arrangement according to a first embodiment of the present invention.

The optical arrangement of this embodiment comprises a stop P and a single lens L, and the first surface of the single lens L provides a diffractive optical surface. Denoted at I is an image plane. The first surface of the single lens L is concentric with respect to the center of the stop P. Namely, if the distance from the first surface of the single lens L to the stop P is t1 and the curvature radius of the first surface of the single lens L is r1, then r1/t1=1.0. In this embodiment, the single lens L has a shape of negative meniscus lens, but because the diffractive optical surface has a large positive power, the lens as a whole has a positive power. The focal length of the refractive system (negative meniscus lens) only is −152 mm, but the focal length of the whole system including the diffractive optical surface is 38 mm.

Figure 2:
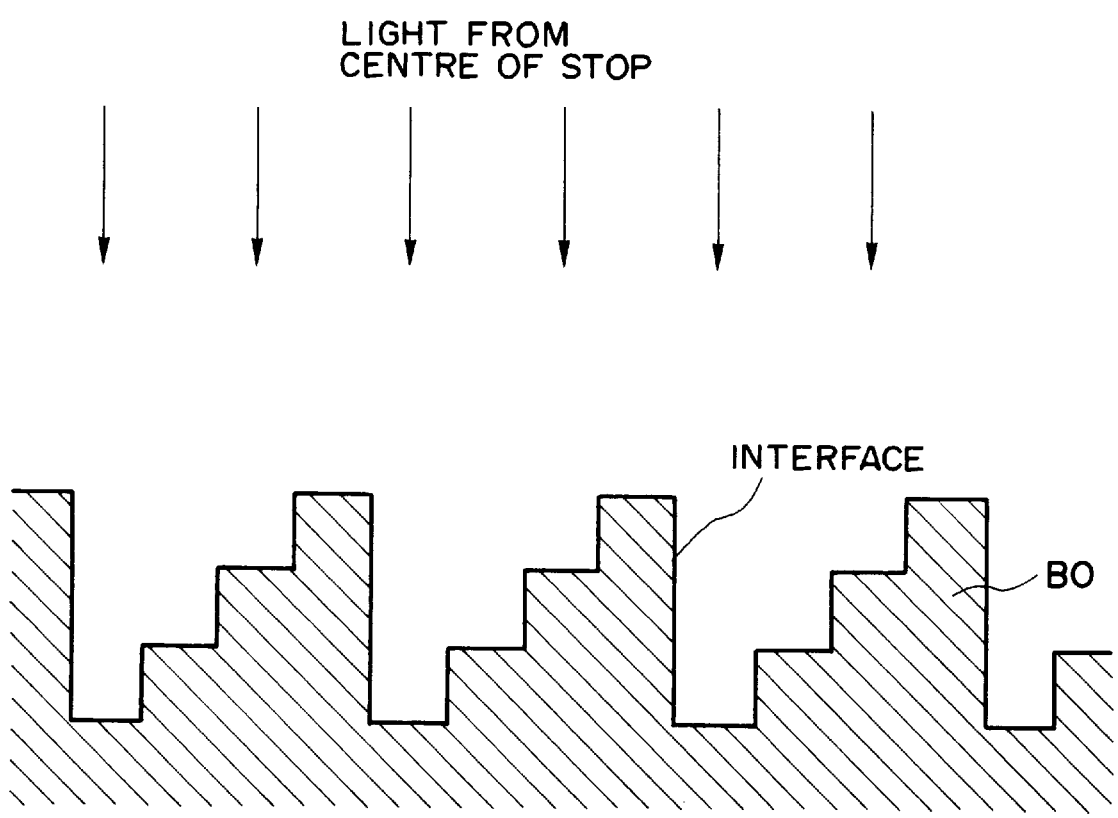
FIG. 2 is an enlarged sectional view of a first interface.

The diffractive optical surface of this embodiment is provided by a ring-like diffraction grating (called "Binary Optical Element") having a sectional shape such as illustrated in FIG. 2. FIG. 2 is an enlarged view of a very narrow region on the first surface and, while it appears that the diffractive optical surface is defined on a flat plane, actually it is formed on a spherical surface. The interfaces of gratings are perpendicular to the spherical surface. The grating pitch becomes smaller, in a direction from the optical axis (center) portion to the peripheral portion, and it is about 1.3 micron at the peripheral portion.

In the optical arrangement of this embodiment as described above, a chief ray is projected on the diffractive optical surface in a direction approximately perpendicular to it. Thus, the diffraction efficiency does not decrease, and a good quality image of small flare is obtainable.

Table 1 below shows numerical data of the first embodiment. In this numerical data, r is a curvature radius, d is the spacing between surfaces, and nd is a refractivity of the optical member with respect to d-line. The positive and negative signs are determined with reference to the advancement direction of light. Thus, r is positive when convexity is on the object side, while it is negative when convexity is on the image side.

TABLE 1

Wavelength = 587.6 nm (d-line)
Focal Length fd = 38.0 mm
F Number = 11
Maximum Image Height = 21.6 mm
Object Distance = Infinite
Stop Position t1 = −20.000 mm

| Surface # | r | d | nd |
|---|---|---|---|
| 1 | −20.000(*) | 0.550 | 1.51633 |
| 2 | −27.091 | | |

Used Diffraction Light = +1st Order Diffraction Light
Optical Path Difference (Phase) Distribution of
Diffractive Optical Surface:
Coefficients $C_1$–$C_4$ where $\Delta L(R)$ mm =
$C_1 \cdot R^2 + C_2 \cdot R^4 + C_3 \cdot R^6 + C_4 \cdot R^8$
(R is the distance in radial direction), are:
$C_1 = -1.6562E-02$
$C_2 = -1.0331E-05$
$C_3 = -3.4868E-09$
$C_4 = -6.6419E-11$

*Diffractive Optical Surface

Figure 3:
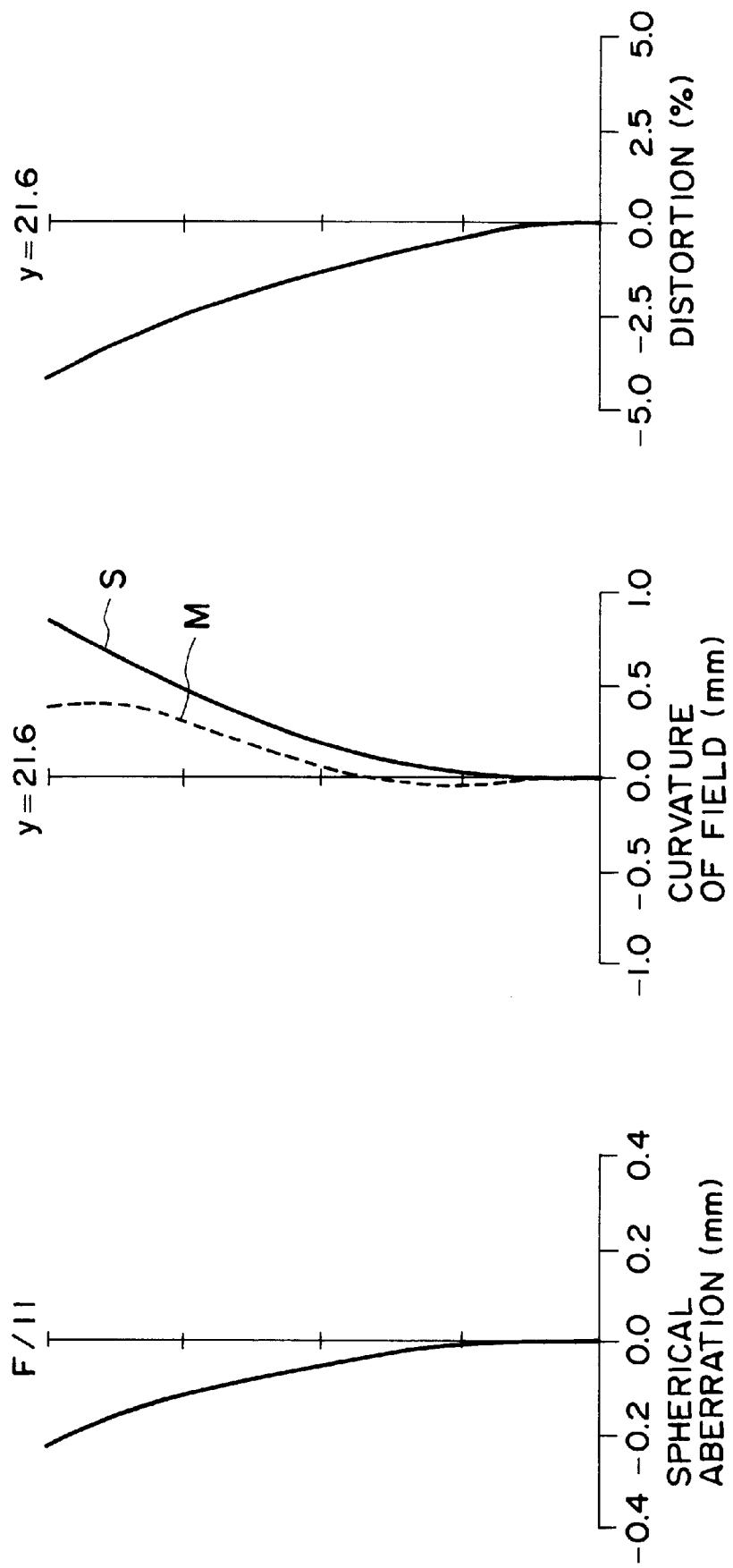
FIG. 3 shows aberrations of the optical arrangement of the first embodiment.

FIG. 3 shows aberrations of the optical arrangement of this embodiment with respect to d-line, and there are spherical aberration, curvature of image field (S: sagittal, M: meridional), and distortion illustrated.

Figure 4:
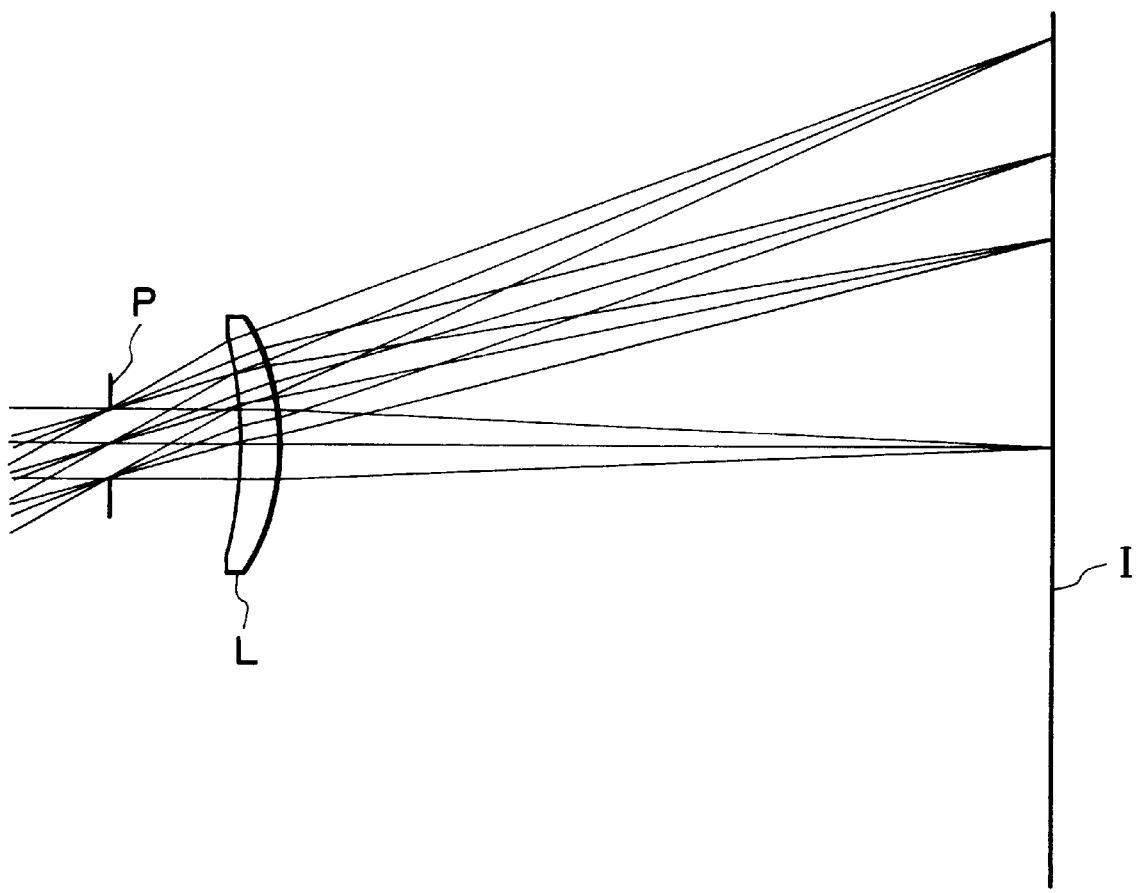
FIG. 4 is a schematic view of an optical arrangement which comprises a refracting system only.
Figure 5:
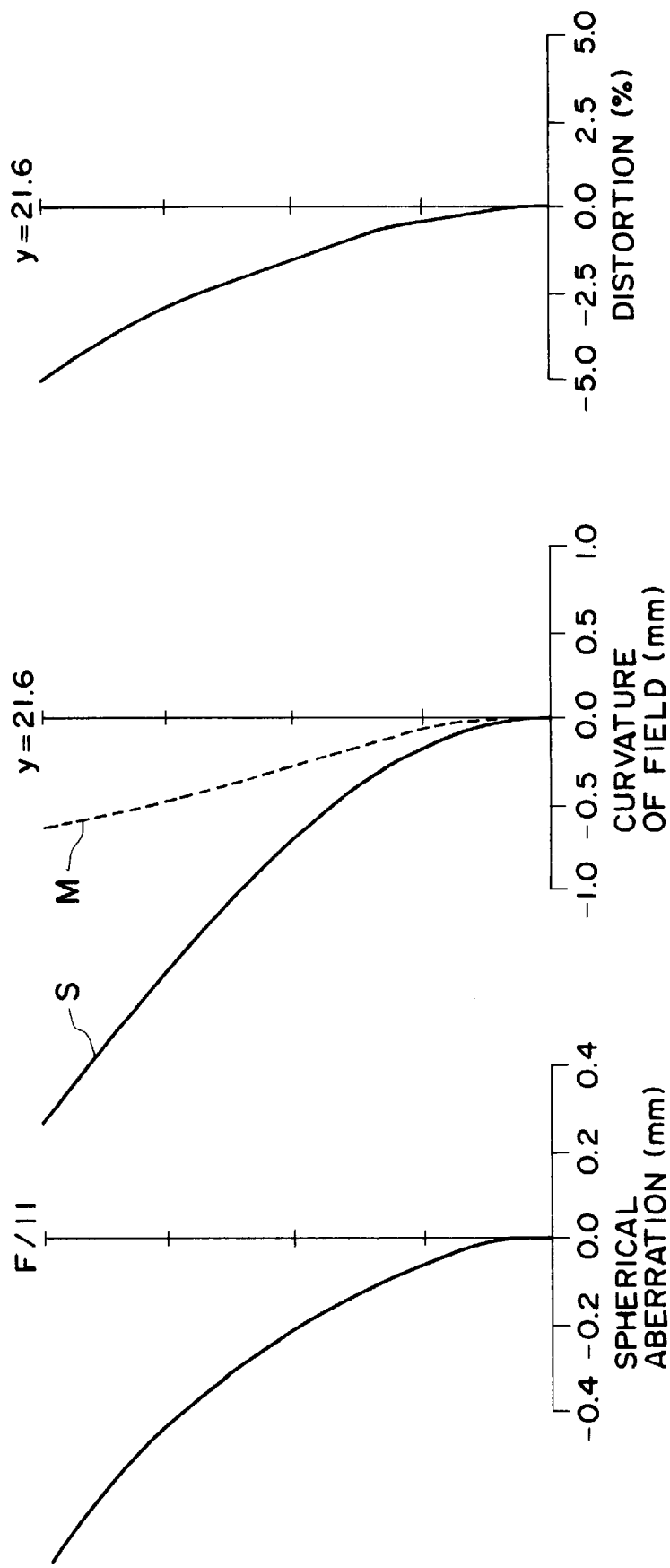
FIG. 5 shows aberrations of the optical arrangement of FIG. 4.

In order to stress good aberration correction in the optical arrangement of this embodiment, comparison will be made with the performance of a spherical surface single lens of the same specification (but having no diffractive optical surface). Table 2 below shows numerical data of such lens, FIG. 4 shows optical paths, and FIG. 5 shows aberrations.

TABLE 2

Wavelength = 587.6 nm (d-line)
Focal Length fd = 38.0 mm
F Number = 11
Maximum Image Height = 21.6 mm
Object Distance = Infinite
Stop Position t1 = −6.606 mm

| Surface # | r | d | nd |
|---|---|---|---|
| 1 | −32.660 | 2.000 | 1.51633 |
| 2 | −12.513 | | |

Comparing FIGS. 3 and 5, it is seen that the aberrations are corrected satisfactorily in the optical arrangement of this embodiment. Particularly, under the influence of the diffractive optical surface, the spherical aberration and curvature of field are corrected sufficiently.

Embodiment 2

Figure 6:
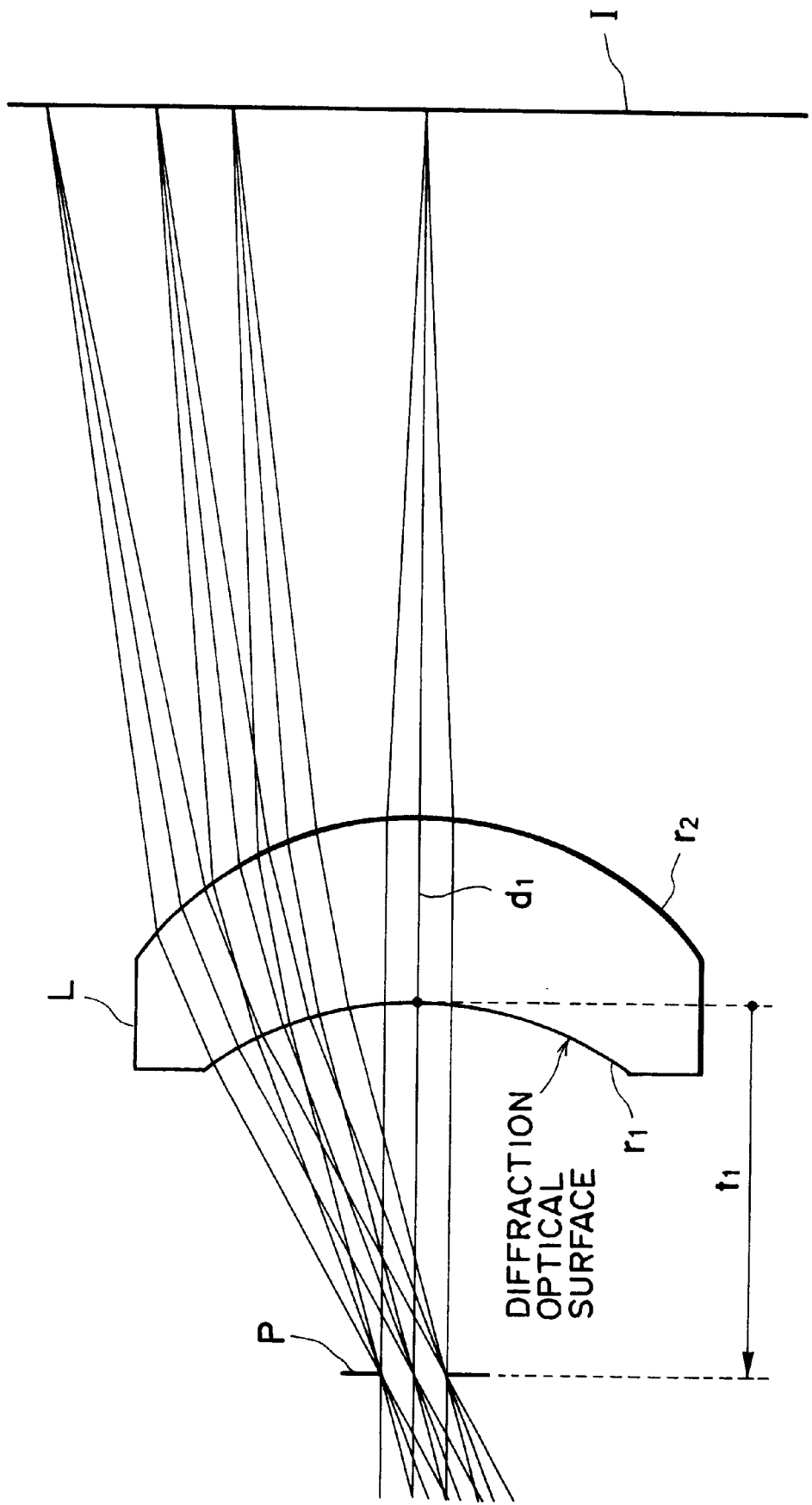
FIG. 6 is a schematic view of an optical arrangement according to a second embodiment of the present invention.

FIG. 6 shows an optical arrangement according to a second embodiment of the present invention.

The optical arrangement of this embodiment similarly comprises a stop P and a single lens L, and also in this case, the first surface of the single lens L provides a diffractive optical surface. The first surface of the single lens L is concentric with respect to the center of the stop P. Namely, if the distance from the first surface of the single lens L to the stop P is t1 and the curvature radius of the first surface of the single lens L is r1, then r1/t1=1.0. In this embodiment, the single lens L has a shape of positive meniscus lens, and the diffractive optical surface also has a positive power. Thus, the whole system has a positive power. The focal length of the refractive system (positive meniscus lens) only is +152 mm, and the focal length of the whole system including the diffractive optical surface is 38 mm.

Also in this embodiment, the diffractive optical surface is provided by a binary optical element (BOE), similar to that of the first embodiment, and the interfaces of gratings are perpendicular to the spherical surface. Thus, like the first embodiment, the diffraction efficiency does not decrease, and a good quality image of small flare is obtainable.

TABLE 3

Wavelength = 587.6 nm (d-line)
Focal Length fd = 38.0 mm
F Number = 11
Maximum Image Height = 21.6 mm
Object Distance = Infinite
Stop Position t1 = −20.000 mm

| Surface # | r | d | nd |
|---|---|---|---|
| 1 | −20.000(*) | 10.000 | 1.51633 |
| 2 | −18.652 | | |

Used Diffraction Light = +1st Order Diffraction Light
Optical Path Difference (Phase) Distribution of
Diffractive Optical Surface:
Coefficients $C_1$–$C_4$ where $\Delta L(R)$ mm =
$C_1 \cdot R^2 + C_2 \cdot R^4 + C_3 \cdot R^6 + C_4 \cdot R^8$
(R is the distance in radial direction), are:
$C_1 = -1.2072E-02$
$C_2 = +4.2142E-06$
$C_3 = +9.3268E-09$
$C_4 = +4.6034E-11$

*Diffractive Optical Surface

Figure 7:
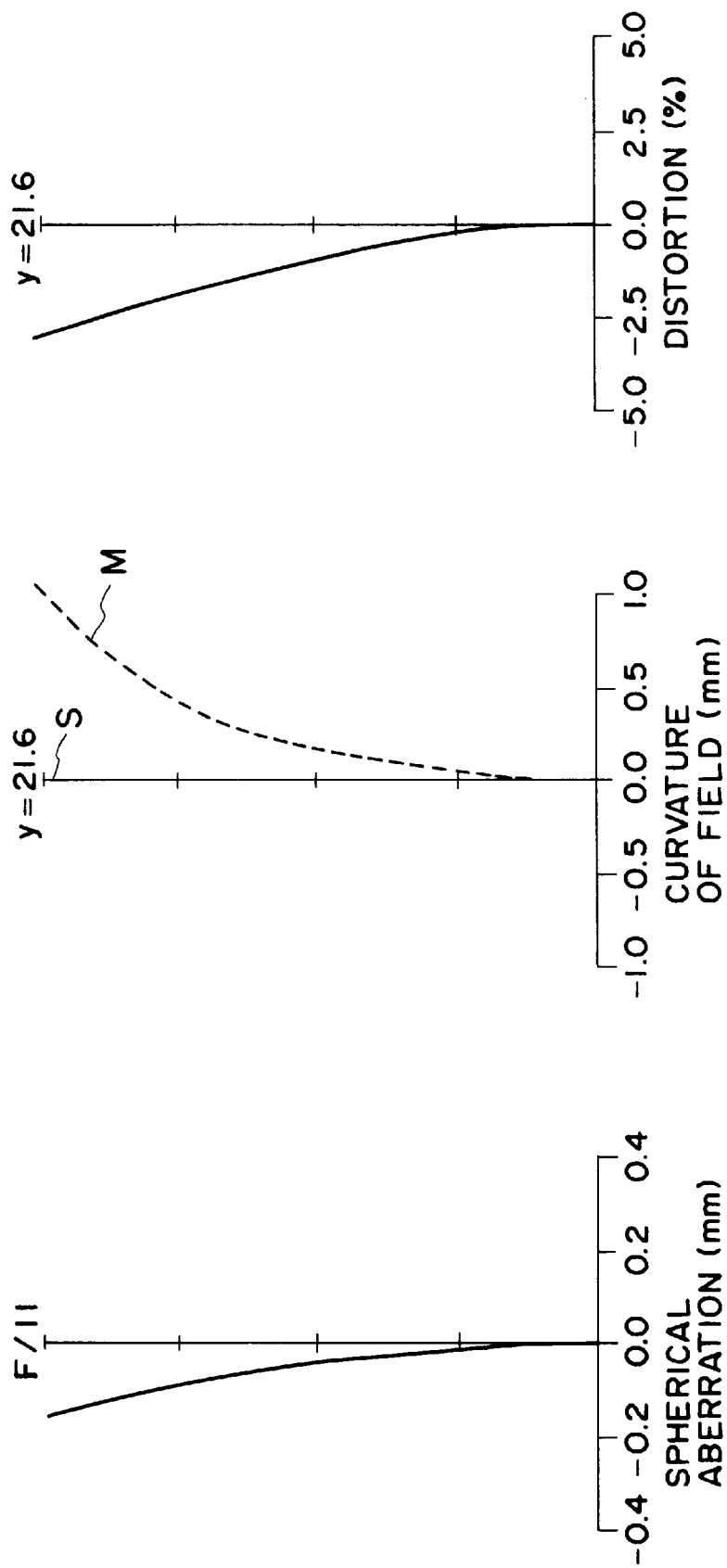
FIG. 7 shows aberrations of the optical arrangement of the second embodiment.

FIG. 7 shows aberrations of the optical arrangement of the second embodiment with respect to d-line, and there are spherical aberration, curvature of image field (S: sagittal, M: meridional), and distortion illustrated.

Comparing FIG. 7 with FIG. 5 (aberrations of conventional lens), it is seen that the aberrations are corrected satisfactorily in the optical arrangement of this embodiment. Particularly, under the influence of the diffractive optical surface, the spherical aberration and curvature of field are corrected sufficiently.

The grating pitch of the diffractive optical surface of this embodiment decreases in a direction from the center to the peripheral portion. However, because the refractive system has a positive power, the pitch at the peripheral portion is slightly larger than that of the first embodiment, and it is about 2.6 microns. In this point, as compared with the diffractive optical surface of the first embodiment, there is an advantage that the manufacture is easier.

Embodiment 3

Figure 8:
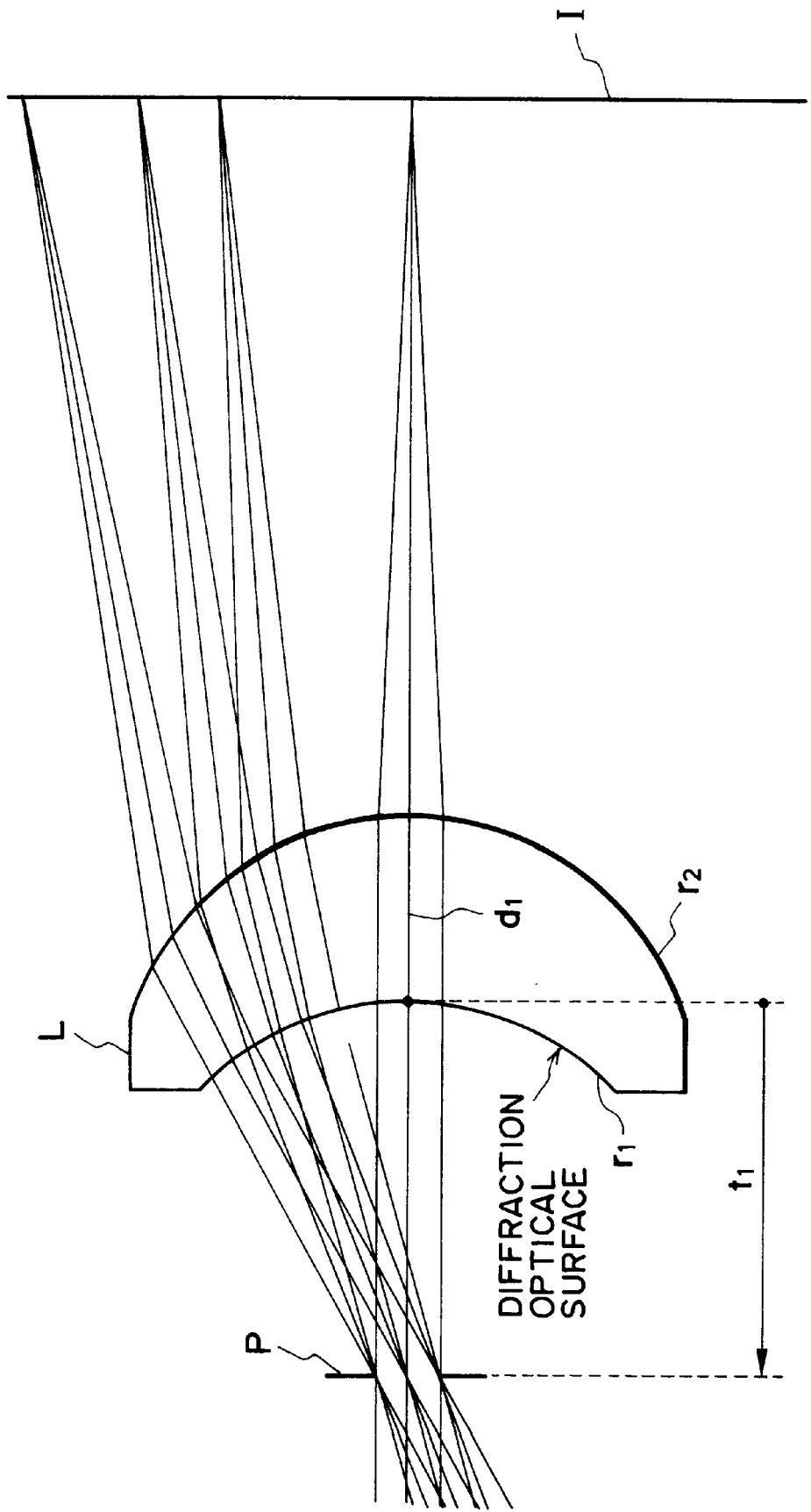
FIG. 8 is a schematic view of an optical arrangement according to a third embodiment of the present invention.

FIG. 8 shows an optical arrangement according to a third embodiment of the present invention.

The optical arrangement of this embodiment similarly comprises a stop P and a single lens L, and also in this case, the first surface of the single lens L provides a diffractive optical surface. The first surface of the single lens L is concentric with respect to the center of the stop P. If the distance from the first surface of the single lens L to the stop P is t1 and the curvature radius of the first surface of the single lens L is r1, then, in this embodiment, r1/t1=0.8. Like the first and second embodiment, the diffractive optical surface is provided by a binary optical element (BOE), and the minimum of grating pitch is about 3.3 microns.

Table 4 below specifically shows numerical data of the third embodiment.

TABLE 4

Wavelength = 587.6 nm (d-line)
Focal Length fd = 38.0 mm
F Number = 11
Maximum Image Height = 21.6 mm
Object Distance = Infinite
Stop Position t1 = −20.000 mm

| Surface # | r | d | nd |
|---|---|---|---|
| 1 | −16.000(*) | 10.000 | 1.51633 |
| 2 | −16.119 | | |

Used Diffraction Light = +1st Order Diffraction Light
Optical Path Difference (Phase) Distribution of
Diffractive Optical Surface:
Coefficients $C_1$–$C_4$ where $\Delta L(R)$ mm =
$C_1 \cdot R^2 + C_2 \cdot R^4 + C_3 \cdot R^6 + C_4 \cdot R^8$
(R is the distance in radial direction), are:
$C_1 = -1.2511E-02$
$C_2 = +8.7404E-06$
$C_3 = +1.1748E-08$
$C_4 = +3.9137E-10$

*Diffractive Optical Surface

Figure 9:
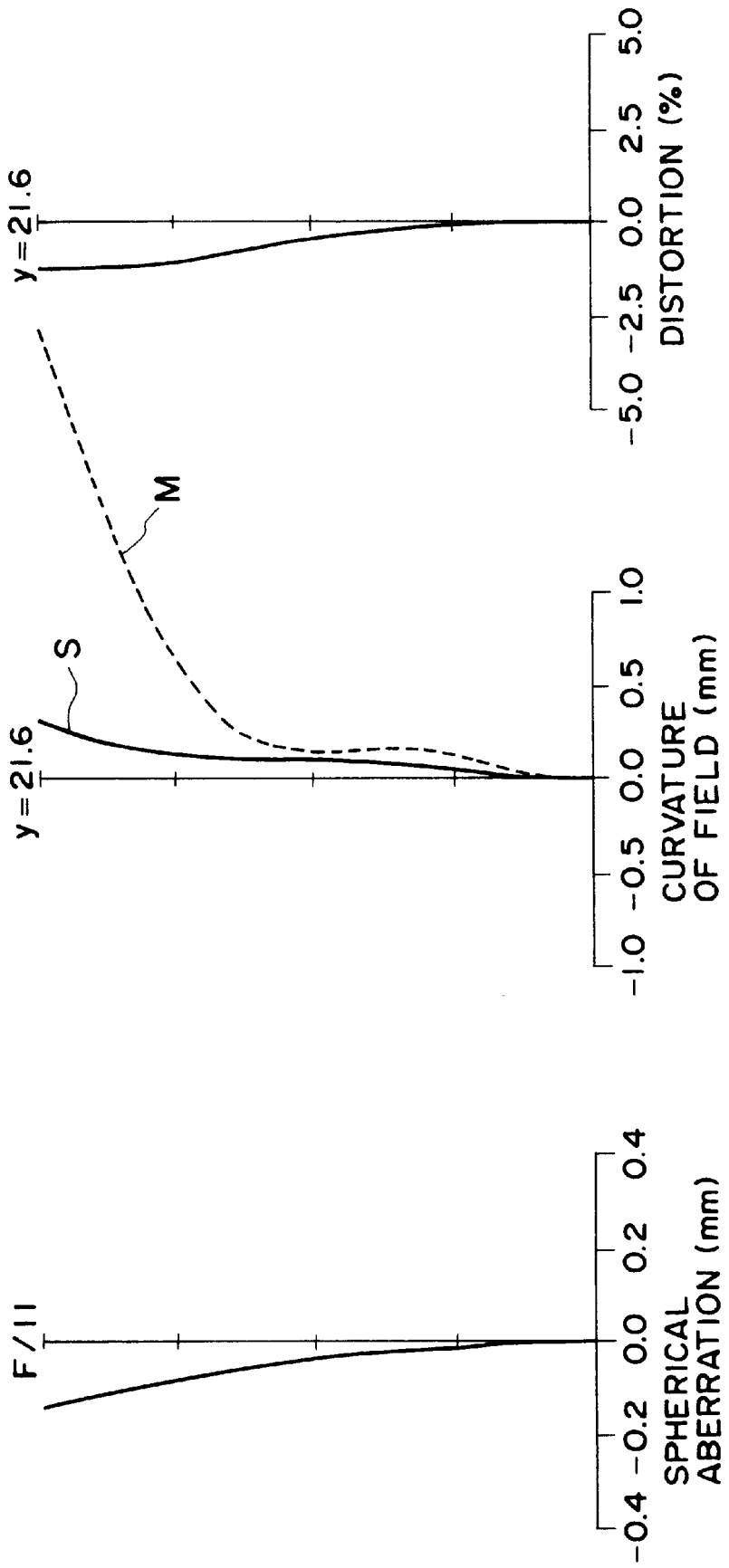
FIG. 9 shows aberrations of the optical arrangement of the third embodiment.

FIG. 9 shows aberrations of the optical arrangement of the third embodiment with respect to d-line, and there are spherical aberration, curvature of image field (S: sagittal, M: meridional), and distortion illustrated.

In this embodiment, meridional image field curvature is slightly large at the peripheral portion. Except that, the aberrations are satisfactorily corrected, owing to the latitude provided by the use of diffractive optical element. The value of r1/t1 is 0.8 and, if the value is lower than this, the image field curvature becomes worse and, additionally, the diffraction efficiency decreases and the flare becomes large.

Embodiment 4

Figure 10:
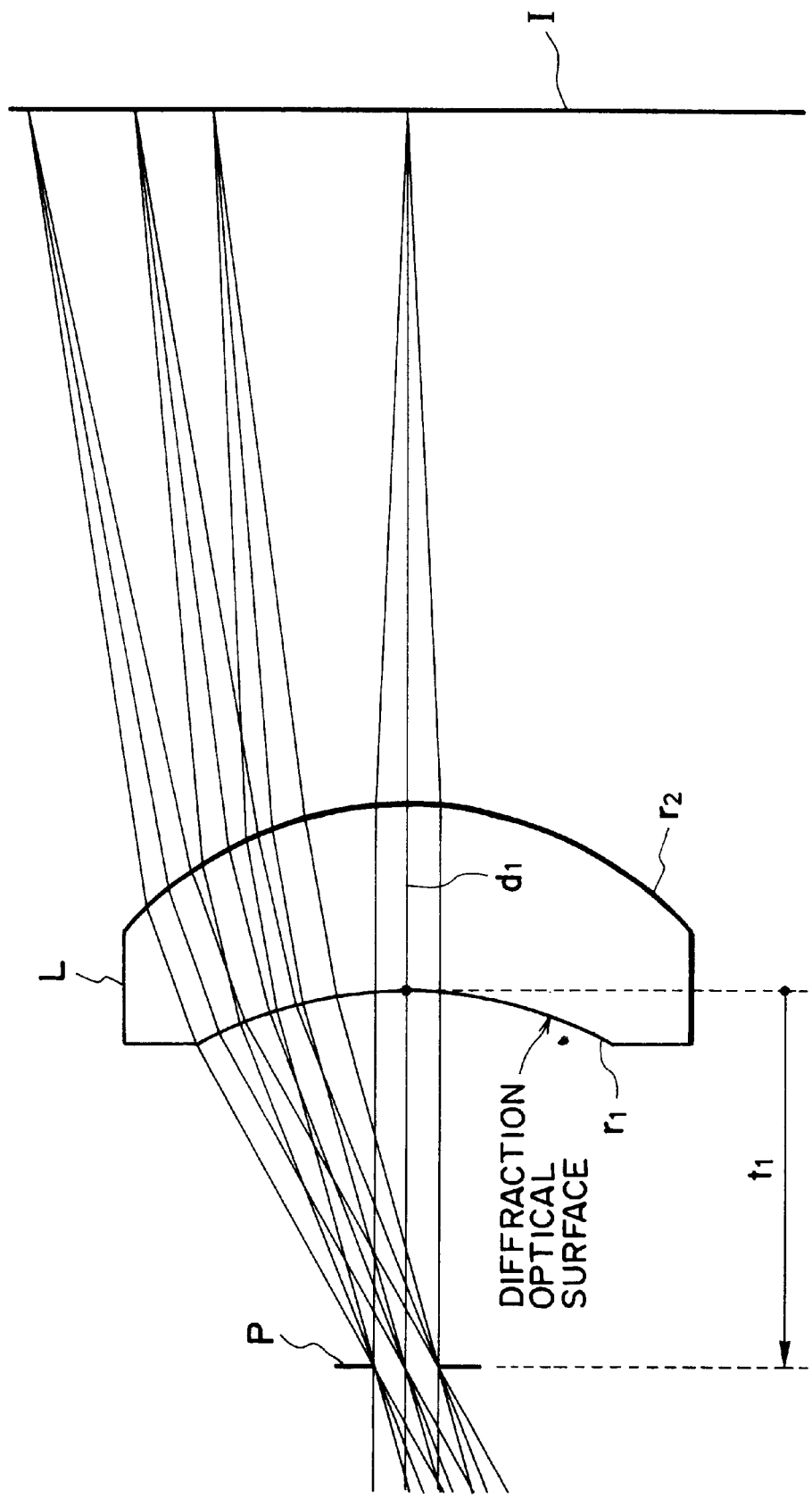
FIG. 10 is a schematic view of an optical arrangement according to a fourth embodiment of the present invention.

FIG. 10 shows an optical arrangement according to a fourth embodiment of the present invention.

The optical arrangement of this embodiment similarly comprises a stop P and a single lens L, and also in this case, the first surface of the single lens L provides a diffractive optical surface. The first surface of the single lens L is concentric with respect to the center of the stop P. If the distance from the first surface of the single lens L to the stop P is t1 and the curvature radius of the first surface of the single lens L is r1, then, in this embodiment, r1/t1=1.2. The diffractive optical surface is provided by a binary optical element (BOE), and the minimum of grating pitch is about 2.4 microns.

Table 5 below shows specific numeral data of the fourth embodiment.

TABLE 5

Wavelength = 587.6 nm (d-line)
Focal Length fd = 38.0 mm
F Number = 11
Maximum Image Height = 21.6 mm
Object Distance = Infinite
Stop Position t1 = −20.000 mm

| Surface # | r | d | nd |
|---|---|---|---|
| 1 | −24.000(*) | 10.000 | 1.51633 |
| 2 | −20.987 | | |

Used Diffraction Light = +1st Order Diffraction Light
Optical Path Difference (Phase) Distribution of
Diffractive Optical Surface:
Coefficients $C_1$–$C_4$ where $\Delta L(R)$ mm =

TABLE 5-continued

Wavelength = 587.6 nm (d-line)
Focal Length fd = 38.0 mm
F Number = 11
Maximum Image Height = 21.6 mm
Object Distance = Infinite
Stop Position t1 = −20.000 mm

| Surface # | r | d | nd |
|---|---|---|---|

$C_1 \cdot R^2 + C_2 \cdot R^4 + C_3 \cdot R^6 + C_4 \cdot R^8$
(R is the distance in radial direction), are:
$C_1 = -1.1780E-02$
$C_2 = +2.6200E-06$
$C_3 = +1.5945E-09$
$C_4 = +1.6714E-11$

*Diffractive Optical Surface

Figure 11:
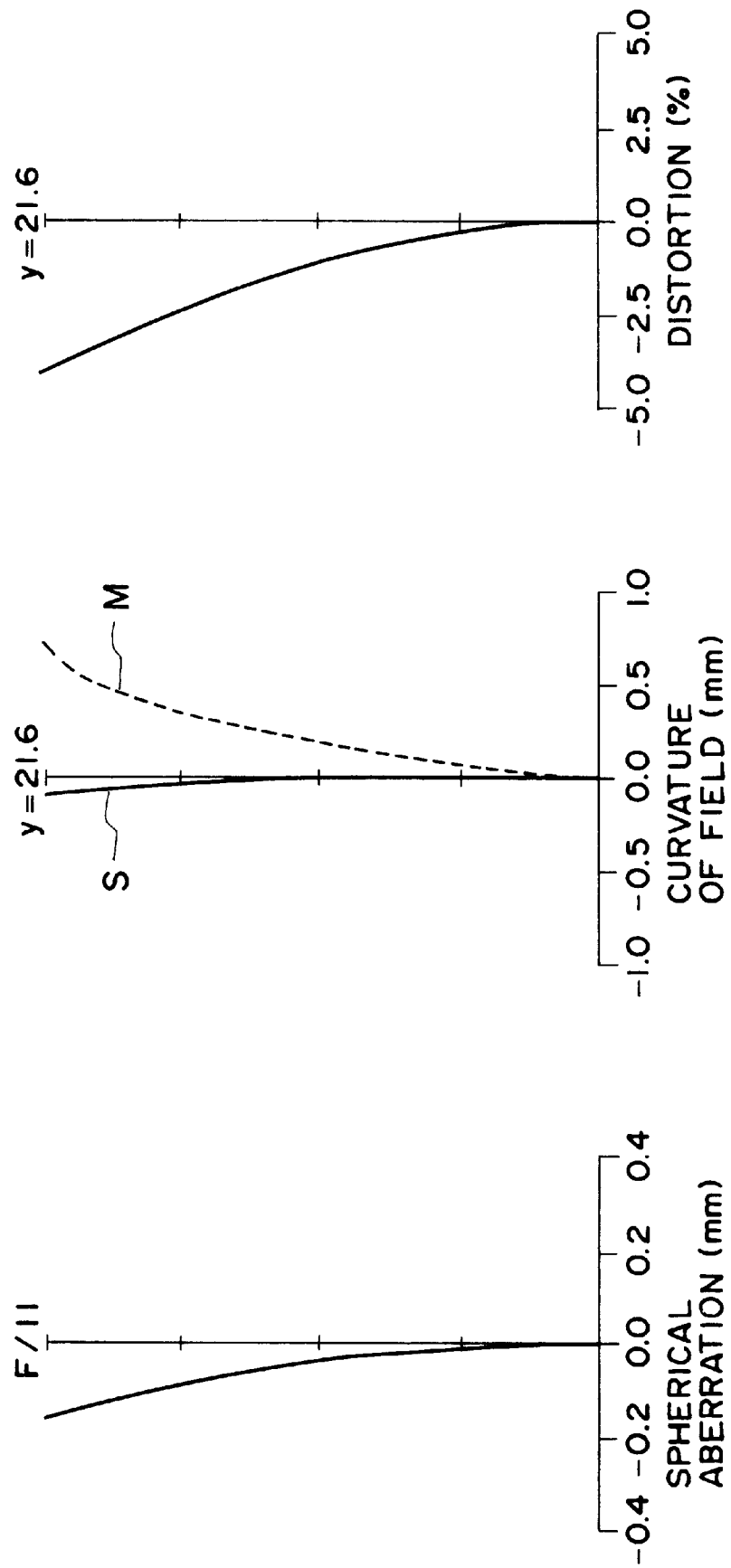
FIG. 11 shows aberrations of the optical arrangement of the fourth embodiment.

FIG. 11 shows aberrations of the optical arrangement of the fourth embodiment with respect to d-line, and there are spherical aberration, curvature of image field (S: sagittal, M: meridional), and distortion illustrated.

In this embodiment, all aberrations are satisfactorily corrected, owing to the latitude provided by the use of diffractive optical element. The value of r1/t1 is 1.2 and, if the value is larger than this, distortion becomes large and, additionally, the diffraction efficiency decreases and the flare increases.

Embodiment 5

In the first to fourth embodiments described above, the first surface of the single lens L, that is, the surface just after the stop P, is made substantially concentric with respect to the center of the stop, and a diffractive optical surface is defined on that surface. However, it may be defined on a different surface after the stop P. An example is illustrated in FIG. 12, wherein a diffractive optical surface is defined on the second surface of the single lens L.

Figure 12:
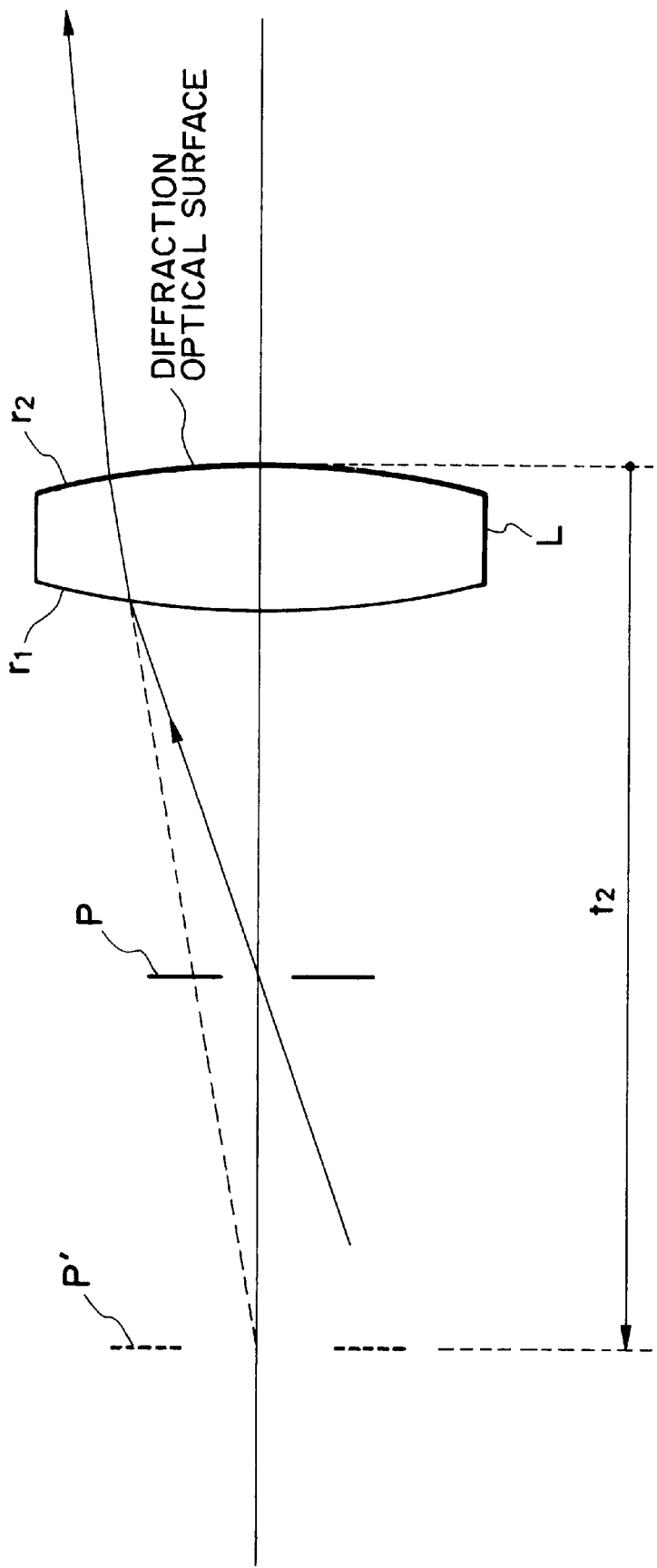
FIG. 12 is a schematic view of an optical arrangement according to a fifth embodiment of the present invention.

FIG. 12 shows the state of imaging of paraxial chief ray. With respect to the second surface, due to refraction by the first surface the actual stop P is optically presented at the position of P'. Thus, the position P' provides an entrance pupil to the second surface (i.e., the stop position as viewed from the second surface). Therefore, by setting the second surface so that it is concentric with respect to the center of the entrance pupil P', a diffractive optical surface can be defined on the second surface essentially in accordance with the same principle as of the preceding embodiments. In this example, if the curvature radius of the second surface of the single lens L is denoted by r2, and if the position of the entrance pupil with respect to the second surface, being measured from the peak of the second surface (i.e., the distance to the position P') is denoted by t2, then r2/t2=1. Practically, as long as this value is within a range of 0.8 to 1.2, deterioration of diffraction efficiency is kept small.

When the optical arrangement comprises plural lenses, similar advantageous results as of the preceding embodiments are attainable, essentially in accordance with the same principle of the fifth embodiment. This may be done, for example, by substantially registering the curvature center of the spherical surface on which the diffractive optical surface is provided, with the center of an image of the stop as viewed from the diffractive optical surface.

Figure 13:
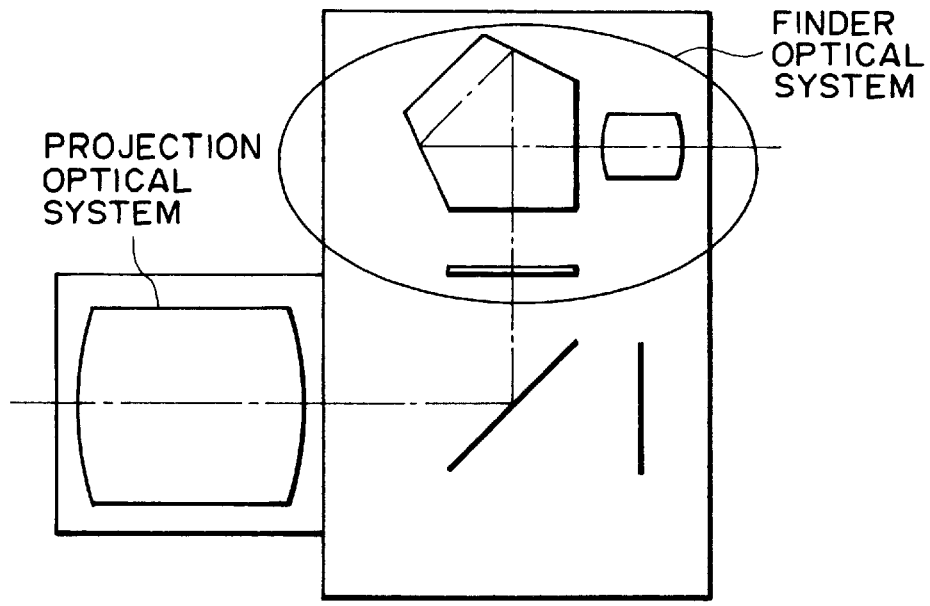
FIG. 13 is a schematic view of an optical arrangement in a photographic camera.
Figure 14:
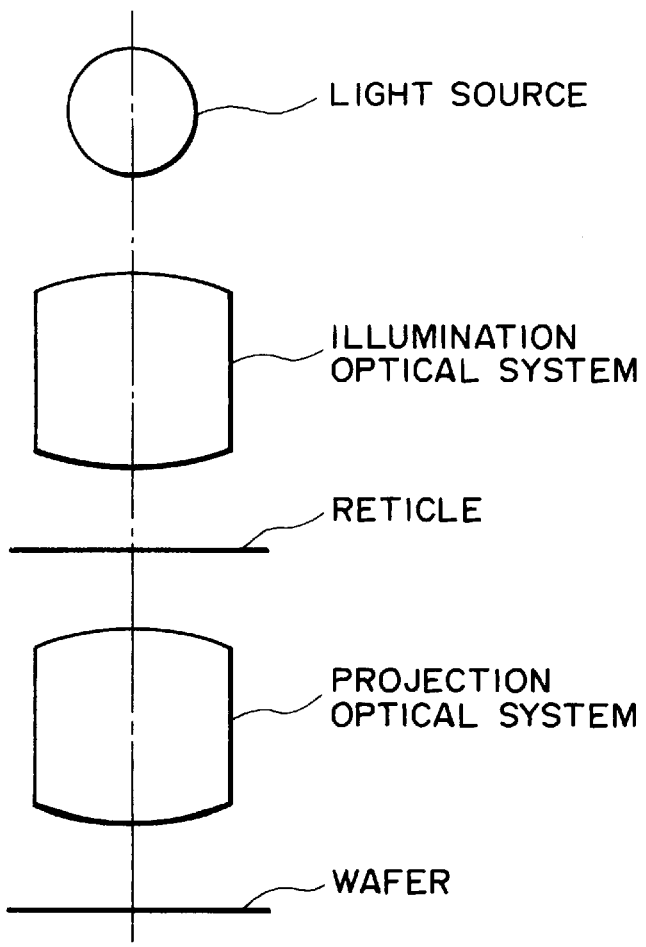
FIG. 14 is a schematic view of an optical arrangement in an exposure apparatus.

While the foregoing embodiments have been described with reference to examples of photographic single lens, for simplification, the present invention is applicable also to an optical arrangement, in general, such as an optical arrangement of a camera as shown in FIG. 13 or an optical arrangement of a semiconductor device manufacturing exposure apparatus as shown in FIG. 14, for example.

In the embodiments described above, the coefficient $C_1$ in the equation representing the optical path difference (phase) distribution of the diffractive optical surface, all has a negative value. It means that the power of the diffractive optical surface is positive. Namely, where the coefficient $C_1$ is set at a negative value, the diffractive optical surface bears a portion of positive power. Thus, the optical system as a whole can have a large positive power, without the necessity of decreasing the curvature radius of the lens. This enables sufficient prevention of aberrations. Although the coefficient $C_1$ may have a positive value so that the diffractive optical surface may have a negative power, since in an imaging optical system a positive power should be provided as a whole, the relation $C_1<0$ should desirably be satisfied as in the embodiments described hereinbefore.

Further, the coefficients $C_1$–$C_4$ should preferably have the same sign. The third-order, fifth-order and seventh-order light ray aberrations can be controlled on the basis of the coefficients $C_2$, $C_3$ and $C_4$, but, in an occasion as the first to fifth embodiments where the optical arrangement is provided by a single lens, higher-order aberrations are produced in the same direction. That is, if the optical arrangement is provided by a single lens, by setting the coefficients $C_1$–$C_4$ with the same sign, higher-order aberrations can be corrected satisfactorily. Only the coefficients $C_2$–$C_4$ are negative in the first embodiment, and this is for the reason that only the first embodiment uses a concave lens (only refractive system has a negative power).

Table 6 shows signs of coefficients $C_1$–$C_4$, of power of only the refractive system, and of power of the diffractive optical system, in the embodiments described hereinbefore.

TABLE 6

| EMBODI-MENT | $C_1$ | $C_2$–$C_4$ | ONLY REFRACTIVE SYSTEM | DIFFRACTIVE OPTICAL SURFACE |
|---|---|---|---|---|
| 1 | − | − | − | + |
| 2 | − | + | + | + |
| 3 | − | + | + | + |
| 4 | − | + | + | + |

While the invention has been described with reference to the structures disclosed herein, it is not confined to the details set forth and this application is intended to cover such modifications or changes as may come within the purposes of the improvements or the scope of the following claims.

What is claimed is:

1. An optical arrangement, comprising:

a stop; and an optical element with a diffractive optical surface;

wherein said diffractive optical surface is defined on a spherical surface of a curvature radius r, and wherein, where the distance from a point on said diffractive optical surface, which point is on an optical axis, to a center of said stop as viewed from said diffractive optical surface is t, a relation $0.8 \leq r/t \leq 1.2$ is satisfied.

2. An optical arrangement according to claim 1, wherein the curvature center of the spherical surface on which said diffractive optical surface is defined is substantially coincident with a center of the stop as viewed from said diffractive optical surface.

3. An optical arrangement according to claim 1, wherein said diffractive optical surface has a plurality of ring-like surfaces disposed about the optical axis, and wherein interfaces of said ring-like surfaces are perpendicular to the spherical surface.

4. An optical arrangement according to claim 3, wherein said diffractive optical surface satisfies a relation $C_1<0$ when a phase distribution thereof is represented by $\Delta L(R)=C_1 \cdot R^2 + C_2 \cdot R^4 + C_3 \cdot R^6 + C_4 \cdot R^8$, where R is the distance in radial direction and $C_1$–$C_4$ are constants.

5. An optical arrangement according to claim 3, wherein said diffractive optical surface has a phase distribution which is represented by $\Delta L(R)=C_1 \cdot R^2 + C_2 \cdot R^4 + C_3 \cdot R^6 + C_4 \cdot R^8$, where R is the distance in radial direction and $C_1$–$C_4$ are constants, and wherein the constants $C_2$, $C_3$ and $C_4$ have the same sign.

6. An optical arrangement according to claim 1, wherein said diffractive optical surface comprises a binary optical surface having a stepped level sectional shape.

7. An optical instrument including an optical arrangement as recited in any one of claims 1–6.

* * * * *

UNITED STATES PATENT AND TRADEMARK OFFICE
CERTIFICATE OF CORRECTION

PATENT NO. : 5,940,214

DATED : August 17, 1999

INVENTOR(S) : Masayuki SUZUKI, et al.

It is certified that error appears in the above-identified patent and that said Letters Patent is hereby corrected as shown below:

<u>COLUMN 7</u>:

Line 4, "In" should read --In all--.
Line 6, "all" should be deleted.

Signed and Sealed this

Seventeenth Day of October, 2000

Attest:

Q. TODD DICKINSON

*Attesting Officer*      *Director of Patents and Trademarks*